United States Patent [19]

Bisson

[11] Patent Number: 4,841,178
[45] Date of Patent: Jun. 20, 1989

[54] ASYNCHRONOUS PROCESSOR ARBITRATION CIRCUIT

[75] Inventor: Joël Bisson, Vancouver, Canada
[73] Assignee: Northern Telecom Limited, Montreal, Canada
[21] Appl. No.: 159,332
[22] Filed: Feb. 23, 1988
[51] Int. Cl.⁴ .................... G01R 19/145; G06F 1/00
[52] U.S. Cl. ................................ 307/518; 367/514; 328/109; 364/200
[58] Field of Search .............. 364/200, 900; 307/514, 307/518, 526, 527; 328/109, 110

[56] References Cited

U.S. PATENT DOCUMENTS

| | | | |
|---|---|---|---|
| 3,444,470 | 5/1969 | Bolt et al. | 328/109 |
| 4,375,639 | 3/1983 | Johnson, Jr. | 364/200 |
| 4,398,105 | 8/1983 | Keller | 307/518 |
| 4,620,118 | 10/1986 | Barber | 364/200 |
| 4,757,217 | 7/1988 | Sawada et al. | 307/518 |

*Primary Examiner*—John S. Heyman
*Assistant Examiner*—Richard Roseen
*Attorney, Agent, or Firm*—Foley & Lardner, Schwartz, Jeffery, Schwaab, Mack, Blumenthal & Evans

[57] ABSTRACT

The invention provides a circuit for arbitrating access to a common resource by a pair of processors using an asynchronous sequential logic circuit. A latch circuit is held in a pseudo-stable state until one or more requests are received from the processor and is then released to toggle to a stable state to allow one or the other of the requests. The grant signal to the selected processor is made available thereto only after a predetermined period of time which is larger than the time required to stabilize the latch circuit.

6 Claims, 3 Drawing Sheets

ASYNCHRONOUS PROCESSOR ARBITRATION CIRCUIT

The invention relates generally to arbitration circuits and more particularly to a circuit for performing the arbitration of access to a common resource by a pair of processors.

BACKGROUND OF THE INVENTION

Whenever a single facility or resource is shared between two working units, it is possible that both working units, running independently, will attempt to access the shared resource simultaneously. This type of operation may be exemplified by the use of a dual-ported random-access memory (RAM).

A dual-ported RAM provides a means for multiprocessor systems to exchange data without directly interfering with each other. In many systems, this data exchange involves a master processing unit (MPU) passing information to a slave processing unit. For example, a host MPU may need to transfer information to a graphic processing unit to direct a display operation. Redundant processing schemes may require a checking processor to compare the results of several processors operating simultaneously. Whatever the application, some form of communication between processors is required.

As its name implies, a dual-ported RAM has two independent ports or address/data/control buses. An arbitration scheme is therefore required to allow two processors to access the same memory contents without interfering with each other. Thus, depending on the amount of dual-ported RAM that is available, messages, instructions, data, may be transferred from one processor to the other.

Access to a dual-ported RAM is usually controlled by one or more semaphore registers. A semaphore register is simply a memory location set aside as a flag to indicate whether or not a dual-ported RAM is currently in use. If the semaphore bit is set, one of the two processors is currently using the dual-ported RAM space and the other processor is not allowed access. Other semaphore registers could be defined to indicate messages available, contents changes, etc. . . .

A similar situation arises in duplicated telecommunication systems. For example, a digital data line module of a contemporary digital switching system may comprise a pair of processors, a plurality of port cards for communication to the outside world and a single digital port maintenance card for performing various maintenance functions. In this case, an arbitration circuit is necessary to regulate the exchange of control and data and prevent possible dual access to the maintenance card. Thus, by definition, a processor arbitration circuit has a request input lead from each of a pair of processors and a select enable lead to each processor.

The existing arbitration circuits are of the so-called synchronous type which require that all signals be referenced to a common or master clock; each processor unit has a select line asynchronous to this clock.

A number of often unrecognized problems are associated with the sampling of asynchronous signals with synchronous clock signals particularly at the operation speeds of contemporary circuitry. Any design of a processor arbitration circuit must consider the metastable conditions that may be generated.

Occasionally, outputs from a synchronized element, usually a D-type flip-flop, exhibit evidence of transient behaviour for periods longer than maximum propagation delays. This abnormality reflects metastable conditions.

An often overlooked point is that the D-type flip-flop itself is an asynchronous device with internal feedback. It is assumed that the output of the flip-flop will take one state or the other in a determinate amount of time independent of the D-input's timing relationship to the flip-flop's clock. However, a D-type flip-flop assumes fundamental mode operation only when the input signals change one at a time and when the circuit is in a stable condition. The duration of the uncertainty window brackets the clock edge which initiates state changes. Its dimensions are the specified setup and hold times of the device and somewhere in that window lies the actual metastable window that will cause the erratic output behaviour. Therefore, a metastable condition can occur any time a signal is random and asynchronous relative to a sampling clock or signal reference.

Metastability increases proportionally as the frequency of the incoming signal increases or as the frequency of the sampling clock increases. However, precautionary measures can be taken to minimize the effects of metastability. These include the avoidance of unnecessary synchronization, moving the asynchronous boundaries to the interface with the lowest possible speeds, and the use of asynchronous design techniques rather than synchronous techniques.

As mentioned above, the processor arbitration circuits presently in use are usually of the synchronous type. A pair of cascaded flip-flops is used for each request line and each pair of flip-flops is clocked with a respective one of clock and inverted clock signals. Since the clocking signals for the two portions of the circuit are 180 degrees apart, then one select signal will always appear on the output of the second flip-flop of one half of the circuit before the other, even during simultaneous access. The output of each second stage flip-flop feeds into the preset input of the other, thereby locking out the later incoming select request. A synchronous arbitration circuit thus requires a full clock cycle for the generation of a select enable at its output.

It is an object of the invention to provide an asynchronous arbitration circuit that does not require the use of clock signals and which can therefore respond to select requests from the processors substantially as they are received.

SUMMARY OF THE INVENTION

In accordance with the invention, there is provided an asynchronous processor arbitration circuit comprising a pair of input terminals for connection to a respective source of request signals from a pair of processors and a latch circuit having set and reset terminals and corresponding output terminals. A first pair of gates each have their respective output connected to the set and reset terminals, a first input terminal connected to a respective one of the input terminals and a second input terminal connected to an enable terminal. A delay circuit is connected to the input terminals and is responsive to a request signal thereon for generating an enabling signal on the enable terminal.

The enabling signal is effective for disabling the first pair of gates after a predetermined period of time subsequent to the occurrence of a request signal, the predetermined period of time being larger than the time required to stabilize the latch circuit.

The invention thus provides an asynchronous sequential circuit which is able to arbitrate simultaneous requests for access to a common resource by a pair of microprocessors without using clock signals.

BRIEF DESCRIPTION OF THE DRAWINGS

An embodiment of the invention will now be described in conjunction with the drawings in which.

DESCRIPTION OF EMBODIMENT

Figure 1:
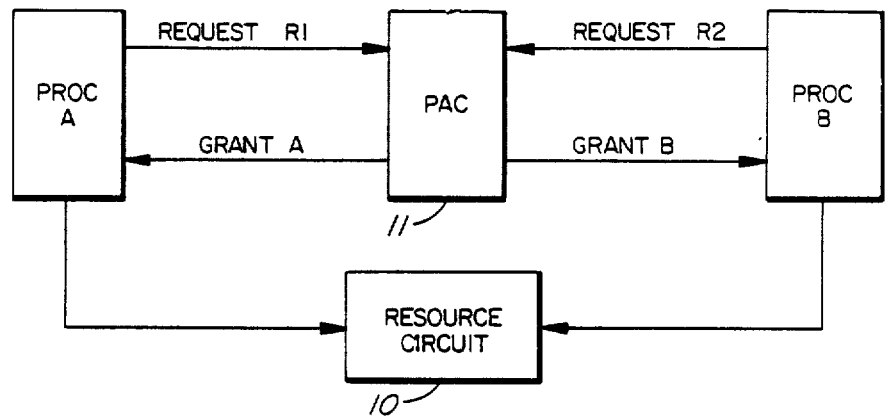
FIG. 1 is a block diagram of a system illustrating the signalling interface to the circuit of the invention.

FIG. 1 illustrates a system using the circuit of the invention. Processors A and B are connected to a resource circuit 10 which may for example be a dual-ported memory or a digital port maintenance circuit in a telecommunication system. Since both processors have equal access capability to the resource circuit 10, it is necessary to provide some means of arbitrating access thereto when both processors wish to access it simultaneously.

Processors A and B are shown connected to a processor arbitration circuit 11 (PAC) by a respective one of request leads R1 and R2. The arbitration circuit 11 responds to the request(s) from the processors A and B by providing one of the processors with a grant signal (A or B) that allows one of the processors to access the resource circuit 10.

Figure 2:
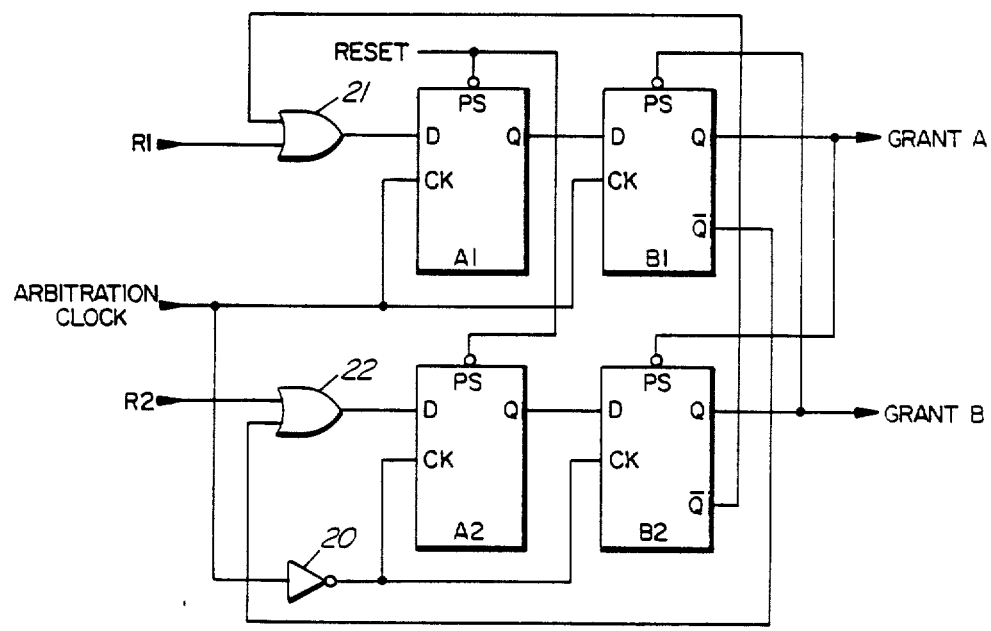
FIG. 2 is a logic schematic diagram of a prior art synchronous arbitration circuit.

FIG. 2 shows a prior art PAC synchronous sequential circuit. The circuit comprises four D latches A1, B1, A2, B2 which form the basis of the arbitration circuit. The first two latches A1 and A2 are clocked on opposite phases of an arbitration clock through the use of inverter 20. Initially after reset, the state of the four D latches is such that the $\overline{Q}$ output of the B1 and B2 latches are low. These outputs are connected to a respective input of OR gates 21 and 22. If one of these two OR gates receives a low input request signal (R1, R2) it will cause a change in one of latches A1 or A2. Since the D latches of the first pair of latches A1, A2 are clocked on opposite phases of the arbitration clock, only one will changes state even if the requests occur simultaneously. The second set of latches B1, B2 provides debounce latches for the first set. The debounce latches are required since, if a rising arbitration clock edge and the D input both change state at the same time, the corresponding Q output could become unstable for an undetermined period of time. The B1, B2 pair of latches are also clocked by the arbitration clock and a clock cycle later, the selected request signal (grant A or grant B) appears at the Q output of the latch corresponding to the selected request signal. The latched signal presets the other D latch and the high $\overline{Q}$ output is cross-coupled to the OR gate input of the first D latch. This feedback holds off the access of the other processor until the first processor has finished its access and releases its request signal. It is therefore seen that a synchronous arbitration circuit is slaved to an arbitration clock and thus an access request can only be processed at periodic intervals.

Figure 3:
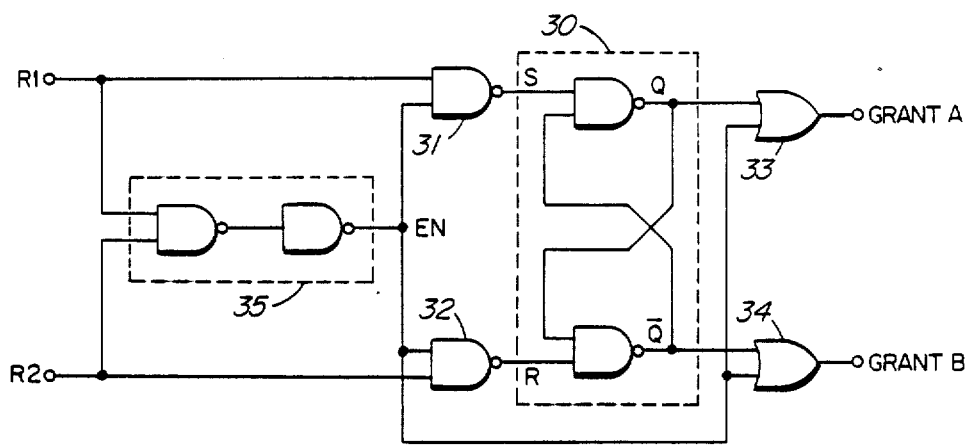
FIG. 3 is a logic schematic diagram of an asynchronous processor arbitration circuit in accordance with the invention.

FIG. 3 illustrates an asynchronous processor arbitration circuit which provides the attributes of the circuit described above but which does not operate with clocking signals. The circuit comprises a latch 30 having set and reset input terminals and a pair of NAND gates 31 and 32 having their respective output connected to the set and reset input terminals of the latch 30. Each of gates 31 and 32 has a first input terminal connected to a respective source (R1, R2) of request signals and a second input connected to an enable terminal. Each one of a pair of OR gates 33 and 34 has a first input terminal connected to a respective one of the Q and $\overline{Q}$ output terminals of the latch 30 and a second input terminal connected to the enable terminal. The output terminals of gate 33 and 34 are connected to the circuit output terminals on which the grant A and grant B signals are available. A delay circuit 35 has a pair of inputs connected to the circuit input terminals (R1, R2) and an output terminal connected to the enable terminal. The delay circuit 35 is responsive to a request signal on either of the input terminals for generating an enable signal on the enable terminal. The enabling signal must be effective for disabling gates 31 and 32 after a predetermined period of time subsequent to the occurrence of a request signal. The delay period must be larger than the time required to stabilize the latch circuit. Whereas the latch 30 and gates 31 to 34 may be realized using FAST-type NAND gates, the delay circuit 35 may be realized using a pair of cascaded low power Schottky NAND gates. Of course, the delay period may be adjusted by using a delay line or additional gate(s).

Figure 4A:
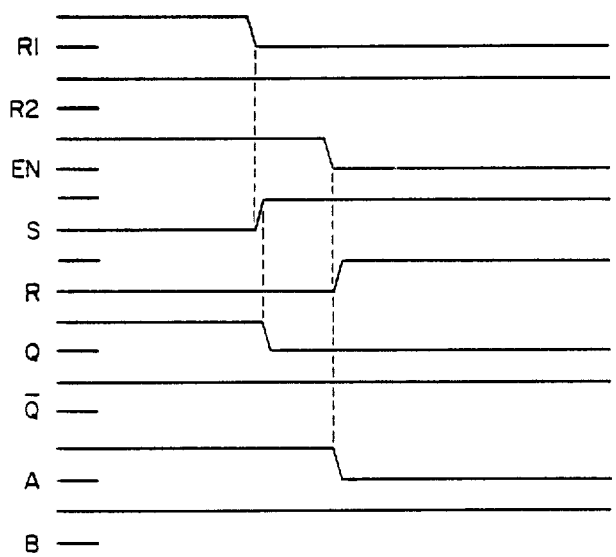
FIGS. 4A and 4B are waveform diagrams illustrating the timing at various locations in the circuit of FIG. 3.
Figure 4B:
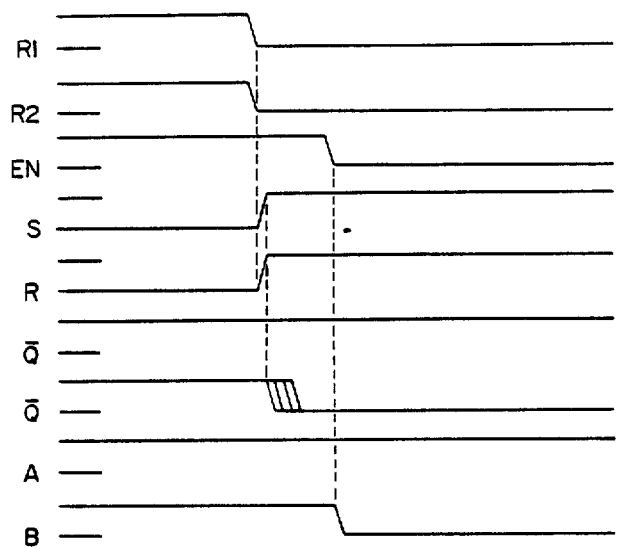

The operation of the circuit may be more fully comprehended through the use of FIGS. 4A and 4B. FIG. 4A is a waveform diagram illustrating the timing at various points in the circuit of FIG. 3 when a single request signal is received whereas FIG. 4B is a similar waveform diagram illustrating the timing when simultaneous request signals are present at the input terminals.

In its quiescent state, the circuit input terminals R1, R2 are high as is the enable terminal thereby causing the set and reset terminals to be low thus forcing the latch to assume a pseudo-stable state in which both the Q and $\overline{Q}$ outputs assume the same state. If one of the inputs is asserted, for example R1, the set input goes high and the Q output goes low. The grant A signal is then subsequently asserted as soon as the enable signal is asserted since gate 33 provides the AND function of the signals on its input terminals. Thus, processor A is given access to the common resource until it withdraws its request signal on terminal R1.

In the case where both processors assert their request signal simultaneously or at least substantially simultaneously, both the set and reset terminals of the latch 30 will go high substantially simultaneously thereby releasing the latch to toggle one way or another depending on a number of factors such as the real difference in time, if any, between the request signals, the actual time delay in the signal propagation between input terminals and the set and reset terminals and any differential in time between the gates of the latch itself. As in any feedback design, there will be a short period of uncertainty before the latch finally toggles; this is indicated on the $\overline{Q}$ waveform of FIG. 4B. That uncertainty does not affect the operation of the arbitration circuit since the grant signal is available only after the enable signal has been asserted and that is effected only after a time delay, as dictated by the delay circuit 35, which is chosen to be larger than the maximum time required to stabilize the latch circuit. At the coincidence of the enable signal and $\overline{Q}$ output signal, the grant signal to processor B is asserted.

The circuit of the invention therefore provides an asynchronous arbitration circuit which does not depend on clock signals to realize this function.

Although the preferred embodiment of the invention was realized using mostly NAND gates, it is of course entirely possible to realize the circuit with other types of logic gates without departing from the scope and spirit of the invention.

What is claimed is:

1. An asynchronous processor arbitration circuit comprising, a pair of input terminals each one for connection to a respective source of request signals, a latch circuit having set and reset terminals and corresponding output terminals, a pair of gates each having their respective output terminal connected to the set and reset input terminals and each having a first input terminal connected to a respective one of the pair of input terminals and each gate also having a second input terminal connected to an enable terminal, a delay circuit responsive to a request signal on either of said input terminals for generating an enabling signal on said enable terminal, the enabling signal being effective for disabling said pair of gates after a predetermined period of time subsequent to the occurrence of said request signal, the predetermined period of time being larger than the time required to stabilize the latch circuit and gating means connected between the output terminals of the latch circuit and circuit output terminals, the gating means being responsive to the enabling signal for allowing the output from the latch circuit to be available on the circuit output terminal only after said predetermined period of time.

2. A circuit as defined in claim 1 wherein the delay circuit comprises a plurality of cascaded gates.

3. An asynchronous processor arbitration circuit comprising, a pair of input terminals each one for connection to a respective source of request signals, a latch circuit having set and reset terminals and corresponding output terminals, a pair of gates each having their respective output terminals connected to the set and reset input terminals and each having a first input terminal connected to a respective one of the pair of input terminals and each gate also having a second input terminal connected to an enable terminal, and a delay circuit responsive to a request signal on either of said input terminals for generating an enabling signal on said enable terminal, the enabling signal being effective for disabling said pair of gates after a predetermined period of time subsequent to the occurrence of said request signal, the predetermined period of time being larger than the time required to stabilize the latch circuit and
    a pair of OR gating means connected between the output terminals of the latch circuit and circuit output terminals, the pair of OR gating means being responsive to the enabling signal for allowing the output from the latch circuit to be available on the circuit output terminal only after said predetermined period of time.

4. A circuit as defined in claim 3 wherein the latch circuit and the first pair of gates are NAND gates and wherein the cascaded gates are low power Schottky NAND gates.

5. A circuit as defined in claim 1 wherein the latch circuit and the first pair of gates are NAND gates and wherein the cascaded gates are low power Schottky NAND gates.

6. A circuit as defined in claim 1 wherein the gating means comprise a pair of OR gates each having its output terminal connected to a respective one of the circuit output terminals, a first input connected to a respective output terminal of the latch circuit and a second input connected to the enable terminal.

* * * * *